US008622442B2

(12) United States Patent
Imatomi et al.

(10) Patent No.: US 8,622,442 B2
(45) Date of Patent: Jan. 7, 2014

(54) LID LOCK APPARATUS FOR VEHICLE

(75) Inventors: Yasuo Imatomi, Miyoshi (JP);
Toshihiro Kitamura, Okazaki (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 303 days.

(21) Appl. No.: 12/941,372

(22) Filed: Nov. 8, 2010

(65) Prior Publication Data
US 2011/0115239 A1 May 19, 2011

(30) Foreign Application Priority Data

Nov. 19, 2009 (JP) .................................. 2009-263919

(51) Int. Cl.
*E05C 19/06* (2006.01)
*E05C 1/02* (2006.01)

(52) U.S. Cl.
USPC 292/143; 292/80; 292/DIG. 38; 292/DIG. 63

(58) Field of Classification Search
USPC ........ 292/80, 81, 87, 137, 138, 144, DIG. 38, 292/DIG. 63, 143
See application file for complete search history.

(56) References Cited

U.S. PATENT DOCUMENTS

| 4,408,914 A | * | 10/1983 | Ciesiel et al. | 400/208 |
|---|---|---|---|---|
| 4,419,641 A | * | 12/1983 | Slavin et al. | 335/219 |
| 4,474,393 A | * | 10/1984 | Kimura | 292/171 |
| 4,525,004 A | * | 6/1985 | Tanaka | 292/171 |
| 4,792,166 A | * | 12/1988 | Shiraishi et al. | 292/36 |
| 4,917,418 A | * | 4/1990 | Gokee | 292/125 |
| 5,048,878 A | * | 9/1991 | Takeshita et al. | 292/171 |
| 5,076,622 A | * | 12/1991 | Detweiler | 292/201 |
| 5,137,260 A | * | 8/1992 | Pehr | 215/216 |
| 5,295,602 A | * | 3/1994 | Swanson | 220/786 |
| 5,478,126 A | * | 12/1995 | Laesch | 292/87 |
| 5,609,195 A | * | 3/1997 | Stricklin et al. | 141/346 |
| 5,664,811 A | * | 9/1997 | Martus et al. | 292/144 |
| 5,936,500 A | * | 8/1999 | Martus et al. | 335/229 |
| 6,050,623 A | * | 4/2000 | Martus et al. | 292/337 |
| 6,554,344 B2 | * | 4/2003 | Son | 296/97.22 |

(Continued)

FOREIGN PATENT DOCUMENTS

| JP | 56-71584 U | 6/1981 |
|---|---|---|
| JP | 63-22491 U | 2/1988 |

(Continued)

OTHER PUBLICATIONS

Office Action issued Jun. 4, 2013, in Japanese Patent Application No. 2009-263919, filed Nov. 19, 2009 (with English language translation).

(Continued)

*Primary Examiner* — Carlos Lugo
(74) *Attorney, Agent, or Firm* — Oblon, Spivak, McClelland, Maier & Neustadt, L.L.P.

(57) ABSTRACT

A lid lock apparatus for a vehicle includes a retainer, a cap, and a lock pin. The retainer includes a fitting portion to which an end portion of the cap is configured to fit from an outside of the lid box towards an inside of the lid box and a first engaging portion formed to be positioned outward of the lid box relative to the fitting portion. The cap includes an operational lever portion configured to be elastically deformed to tilt by an operation at an outside of the lid box and including a second engaging portion configured to engage with and disengage from the first engaging portion.

4 Claims, 10 Drawing Sheets

(56) References Cited

U.S. PATENT DOCUMENTS

| | | | |
|---|---|---|---|
| 6,793,266 B2 * | 9/2004 | Park | 296/97.22 |
| 7,302,818 B2 * | 12/2007 | Usuzaki et al. | 70/256 |
| 8,020,901 B2 * | 9/2011 | Watanabe | 292/80 |
| 8,020,902 B1 * | 9/2011 | Li | 292/80 |
| 2012/0248792 A1 * | 10/2012 | Ban et al. | 292/144 |

FOREIGN PATENT DOCUMENTS

| | | |
|---|---|---|
| JP | 4-302680 | 10/1992 |
| JP | 8-93295 | 4/1996 |
| JP | 2000-8672 | 1/2000 |
| JP | 2001-065215 | 3/2001 |
| JP | 2001-65658 | 3/2001 |
| JP | 2010-281393 | 12/2010 |

OTHER PUBLICATIONS

Office Action issued Nov. 5, 2013, in Japanese Patent Application No. 2009-263919 filed Nov. 19, 2009 (w/English language translation).

* cited by examiner

LID LOCK APPARATUS FOR VEHICLE

CROSS REFERENCE TO RELATED APPLICATIONS

This application is based on and claims priority under 35 U.S.C. §119 to Japanese Patent Application 2009-263919, filed on Nov. 19, 2009, the entire content of which is incorporated herein by reference.

TECHNICAL FIELD

This disclosure relates to a lid lock apparatus for a vehicle.

BACKGROUND DISCUSSION

A known lid lock apparatus for a vehicle is disclosed in JP2000-8672A (i.e., hereinafter referred to as Patent reference 1). The known lid lock apparatus disclosed in Patent reference 1 includes a retainer provided at a support wall of a lid box formed on a vehicle body, a cap detachably assembled to the retainer, and a lock pin movable relative to the cap and arranged penetrating through the support wall to protrude inside the lid box (i.e., outside the vehicle body). Further according to the known lid lock apparatus disclosed in Patent reference 1, a fuel filler door for opening and closing an opening portion of the lid box is assembled to be tilting relative to the lid box. The fuel filler door is retainable at a closed state by the lock pin (i.e., locked state).

Patent reference 1 discloses a known lid lock apparatus for a vehicle in which a cap (i.e., referred to as a lock in Patent reference 1) is attachable to and detachable from a retainer assembled to a support wall of a lid box by a manual operation operated outside the lid box (i.e., inside a vehicle body). Patent reference 1 further discloses a modified lid lock apparatus for a vehicle based on the foregoing known lid lock apparatus, in which a cap is attachable to and detachable from a retainer assembled to a support wall of a lid box by a manual operation operated outside the lid box (i.e., inside a vehicle body) and the retainer assembled to the support wall of the lid box is removable from the support wall together with the cap by a manual operation operated inside the lid box (i.e., outside the vehicle body).

According to the known lid lock apparatus for the vehicle disclosed in the Patent reference 1, because the cap is detachable relative to the retainer provided at the support wall of the lid box by the manual operation operated outside the lid box (i.e., inside a vehicle body), manual operations operated inside the lid box (i.e., outside the vehicle body) are not necessary, which is advantageous. However, according to the constructions disclosed in Patent reference 1, when assembling the cap to the retainer, a positioning operation of the cap relative to the retainer, an inserting operation of the cap to the retainer, and a rotating operation of the cap relative to the retainer are required. Thus, according to the constructions disclosed in Patent reference 1, there are drawbacks that assembling man-hour is large and misassembling is likely to occur because it is difficult for an operator to recognize that the assembling of the cap to the retainer is completed.

On the other hand, according to the modified lid lock apparatus for the vehicle disclosed in Patent reference 1, notwithstanding the foregoing drawbacks are resolved, the retainer and the cap is removed from the support wall by the manual operation operated at an outside the lid box (i.e., inside the vehicle body) with plural steps including a rotational operation, which deteriorates the workability.

A need thus exists for a lid lock apparatus for a vehicle which is not susceptible to the drawback mentioned above.

SUMMARY

In light of the foregoing, the disclosure provides a lid lock apparatus for a vehicle, which includes a retainer provided at a support wall of a lid box formed at a vehicle body, a cap detachably assembled to the retainer, a lock pin assembled to move axially relative to the cap, the lock pin being arranged penetrating through the support wall and protruding within the lid box, a lid configured to tilt relative to the lid box and opening and closing an opening portion of the lid box, the lid being configured to be retained at a closed state by the lock pin, the retainer being formed with a fitting portion to which an end portion of the cap is configured to fit from an outside of the lid box towards an inside of the lid box and a first engaging portion formed to be positioned outward of the lid box relative to the fitting portion, and an operational lever portion formed on the cap, the operational lever portion configured to be elastically deformed to tilt by an operation at an outside of the lid box and including a second engaging portion configured to engage with and disengage from the first engaging portion. The second engaging portion of the operational lever portion is elastically engaged with the first engaging portion of the retainer to restrict a disengagement of the cap from the retainer when the operational lever portion is not operated in a state where the end portion of the cap is fitted to the fitting portion of the retainer. The second engaging portion of the operational lever portion is disengaged from the first engaging portion of the retainer to allow the cap to disengage from the retainer when the operational lever is operated to be a tilting state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
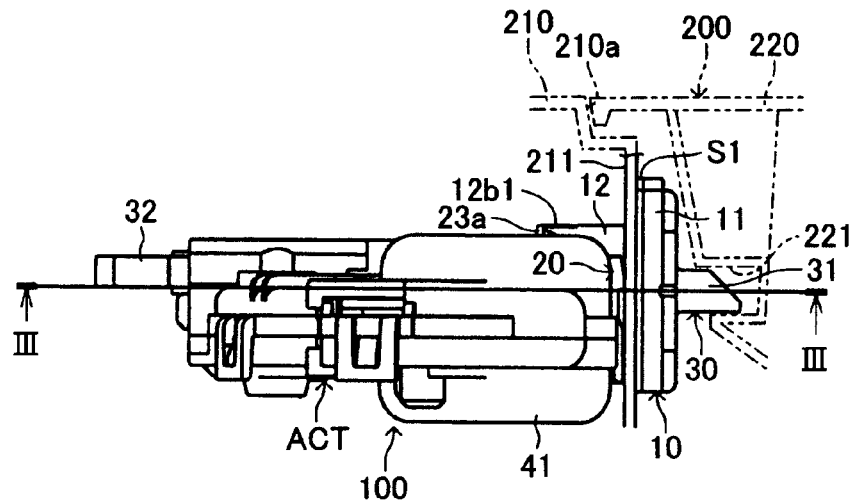
FIG. 1 is a plan view of a lid lock apparatus for a vehicle according to a first embodiment disclosed here.
Figure 2:
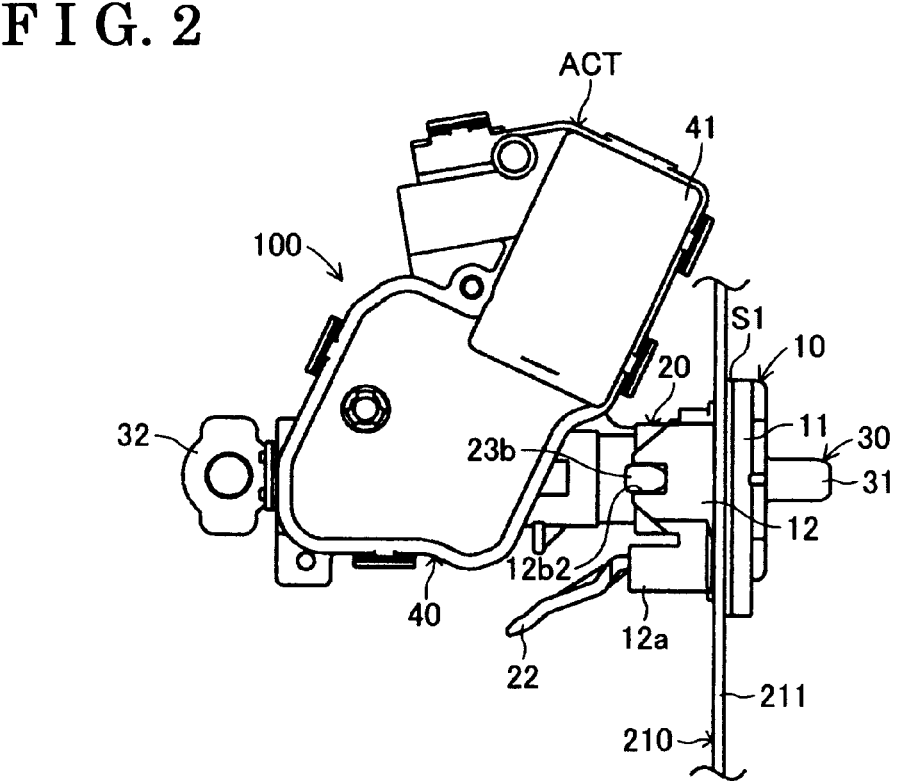
FIG. 2 is a lateral view of the lid lock apparatus for the vehicle according to the first embodiment.

One embodiment of a lid lock apparatus for a vehicle will be explained with reference to illustrations of drawing figures as follows. As illustrated in FIG. 1, a lid lock apparatus 100 for a vehicle includes a retainer 10 made of resin, a cap 20 made of resin, and a lock pin 30 made of resin. The retainer 10 is provided at a support wall 211 of a fuel filler lid box (i.e., serving as a lid box) 210 formed at a vehicle body 200. The cap 20 is detachably assembled to the retainer 10. The lock pin 30 is assembled to be movable relative to the cap 20 and is arranged penetrating through the support wall 211 to extend into the fuel filler lid box 210. A fuel filler door (i.e., serving as a lid) 220 which is tiltably assembled to the fuel filler lid box 210 for opening and closing an opening portion 210a of the fuel filler lid box 210 is configured to be retained at a closed state (locked state) by the lock pin 30. The lid lock apparatus 100 for the vehicle includes an actuator ACT for actuating the lock pin 30 to move axially (to advance and retreat) along a longitudinal direction thereof.

Figure 3:
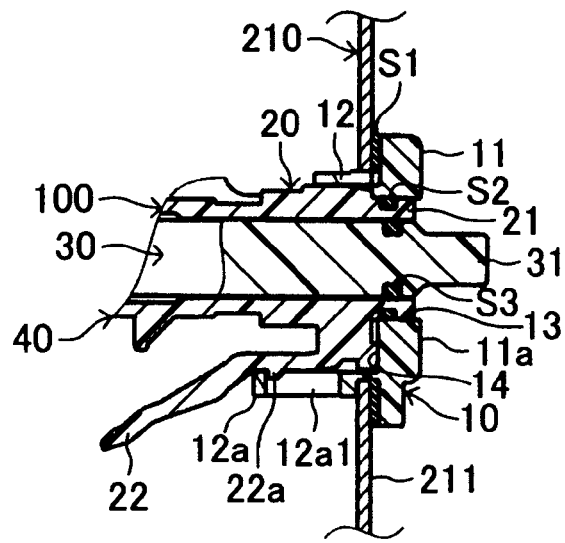
FIG. 3 is a partial longitudinal cross-sectional view of a right side portion of the lid lock apparatus shown in FIG. 1 taken on line III-III in FIG. 1.
Figure 4:
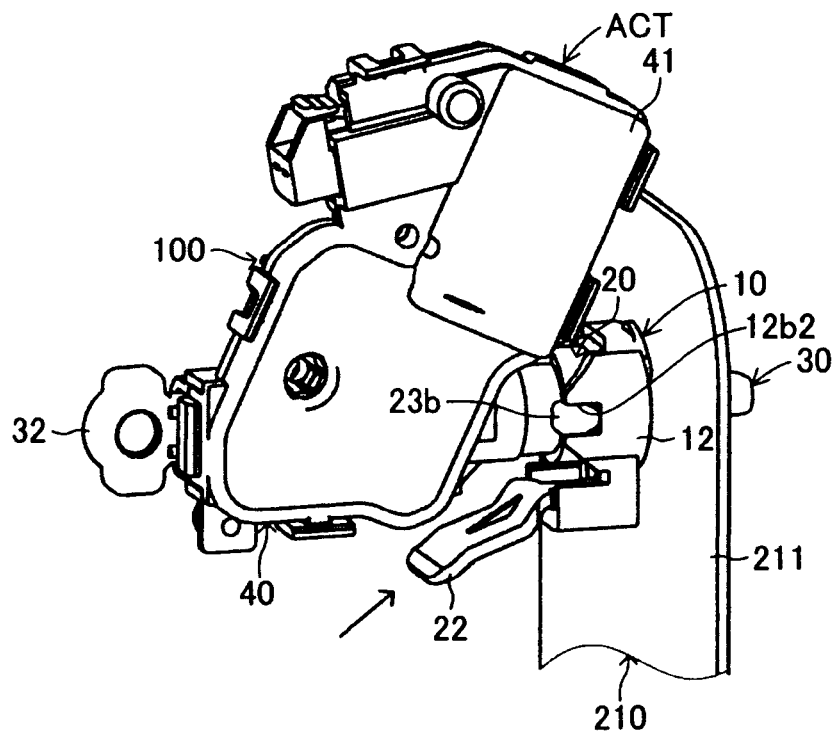
FIG. 4 is a perspective view of the lid lock apparatus viewed from a left upper direction in FIG. 2.
Figure 5:
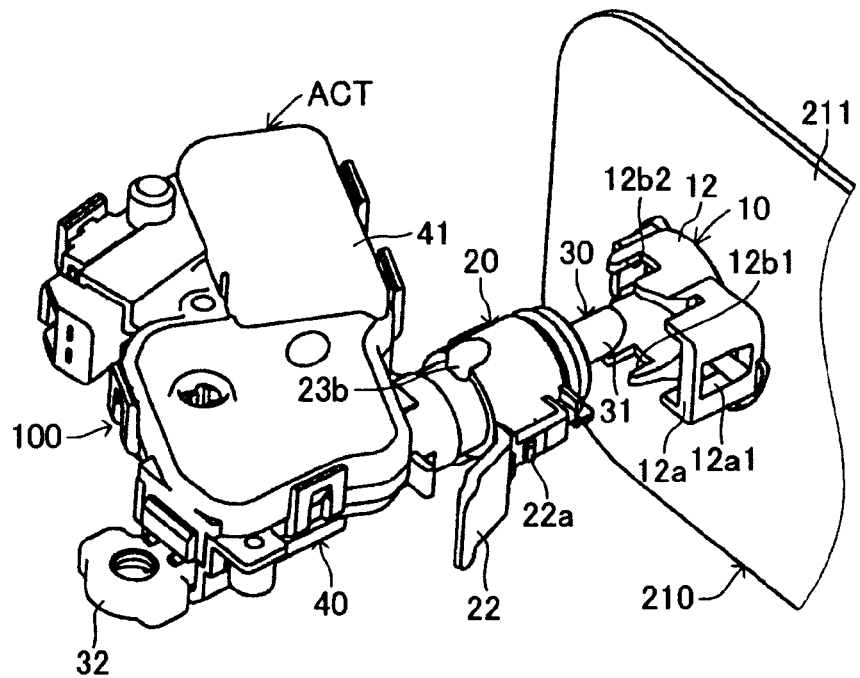
FIG. 5 is a perspective view of a state where a cap, a lock pin, an actuator, or the like, are removed from an actuator shown in FIGS. 2 and 4 viewed from an arrowed direction in FIG. 4.

As illustrated in FIG. 3, the retainer 10 is detachably assembled to the support wall 211 of the fuel filler lid box 210 together with a seal plate S1. The retainer 10 includes a head portion 11, a leg portion 12, and an insertion hole portion 13. As illustrated in FIGS. 7 to 13, the retainer 10 is assembled to the support wall 211 by rotating by a predetermined amount in an arrowed direction shown in FIGS. 14 and 15 in a state where being inserted into an attaching hole 211a formed on the support wall 211 from an inside of the fuel filler lid box (i.e., outside of the vehicle body 200). The attaching hole 211a is formed in a configuration combining a circular shape and approximately rectangular shapes arranged at diagonally opposite positions relative to the circular shape (see FIGS. 14 to 19).

Figure 15:
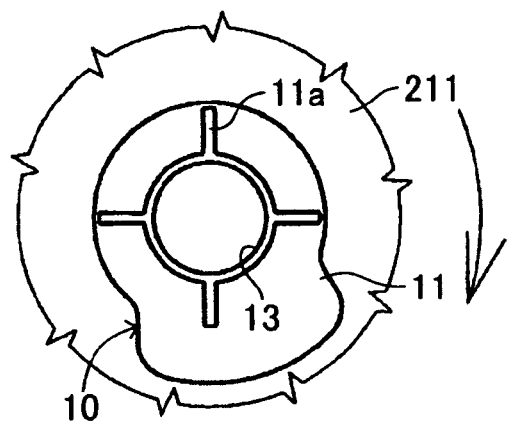
FIG. 15 is a view viewing a state shown in FIG. 14 from inside the fuel filler lid box.
Figure 16:
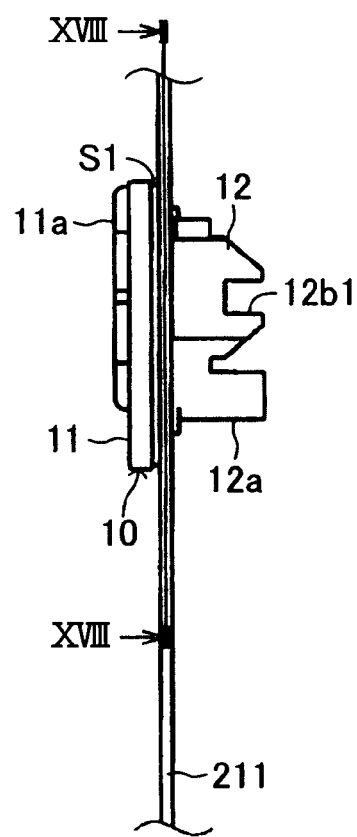
FIG. 16 is a lateral view of the retainer and the support wall shown in FIG. 15.

The head portion 11 of the retainer 10 is configured to engage with an external surface of the support wall 211 facing the outside of the vehicle body 200 (i.e., right hand side surface in FIG. 3) via the seal plate S1. As shown in FIG. 15, the head portion 11 corresponds to a plain plate portion for covering the attaching hole 211a of the support wall 211. A crossed shape projection 11a (see FIGS. 7, 9, and 15), which an operator use when manually rotating the retainer 10 by a predetermined amount, is formed on an end surface (i.e., right end surface in FIG. 3) of the head portion 11.

The leg portion 12 of the retainer 10 is configured to be detachable relative to the attaching hole 211a of the support wall 211. The leg portion 12 is formed with an engaging portion (i.e., serving as a first engaging portion) 12a which protrudes by a predetermined amount from the head portion 11 towards an outside of the fuel filler lid box 210, recess portions 12b1, 12b2 which are formed as a pair, retaining portions 12c1, 12c2 (see FIGS. 14 and 17) formed as a pair, and stopper portions 12d1, 12d2 (see FIGS. 12 and 18) formed as a pair. The engaging portion 12a is arranged to be a lower position in a state where the retainer 10 is assembled to the support wall 211. The engaging portion 12a includes a horizontal portion and a pair of vertical portions. A rectangular shaped hole 12a1 (see FIG. 3) is formed on the horizontal portion.

Each of the recess portions 12b1, 12b2 is arranged to be at a higher position compared to the engaging portion 12a at a portion being away from the support wall 211 by a predetermined distance in a state where the retainer 10 is assembled to the support wall 211. Each of the recess portions 12b1, 12b2 is formed in an approximately U shape along a moving direction of the lock pin 30. The recess portions 12b1, 12b2 open towards a tip end (i.e., in a direction to be away from the support wall 211) of the leg portion 12.

Figure 12:
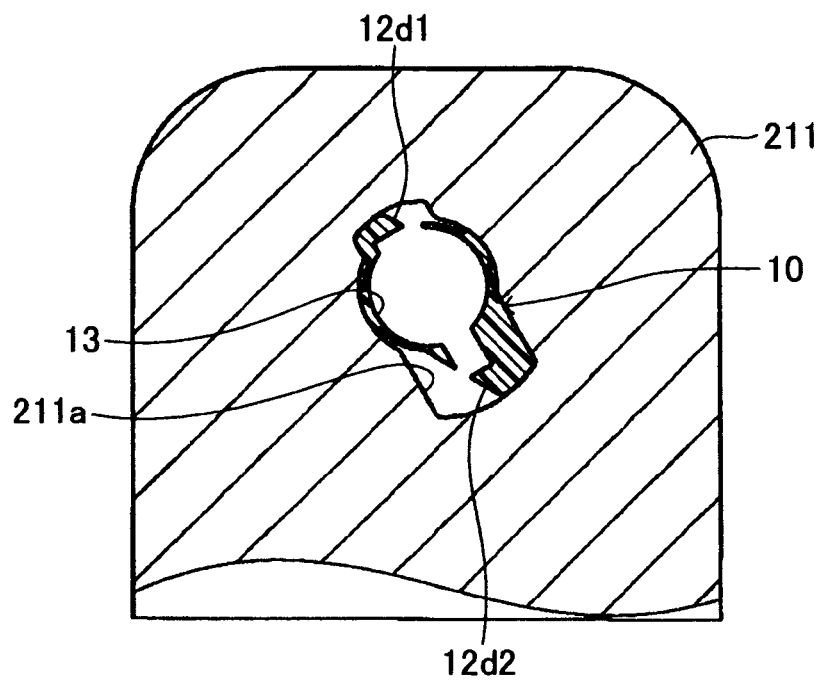
FIG. 12 is a longitudinal cross-sectional view taken on line XII-XII of FIG. 10.
Figure 13:
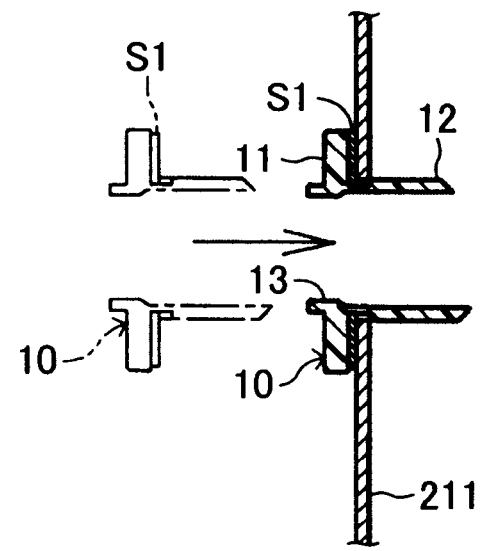
FIG. 13 is a longitudinal cross-sectional view taken on line XIII-XIII of FIG. 11.
Figure 14:
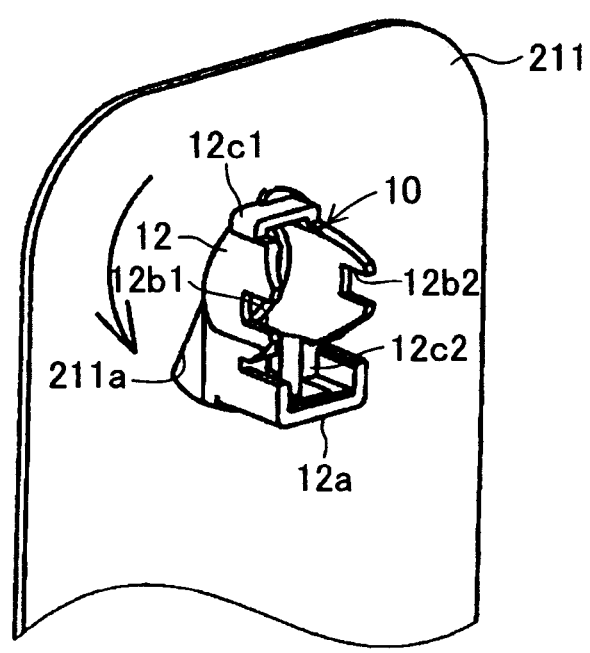
FIG. 14 is a perspective view of a state where the retainer shown in FIG. 8 is rotated in an arrowed direction relative to the support wall to be assembled to the support wall.
Figure 17:
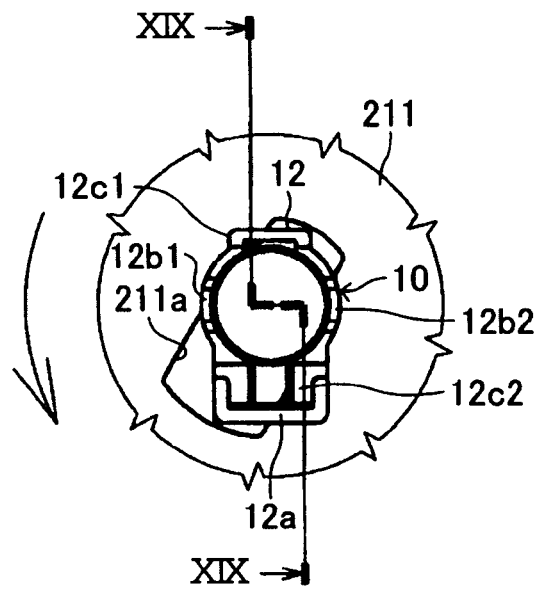
FIG. 17 is a view viewing the state shown in FIG. 14 from outside the fuel filler lid box.
Figure 18:
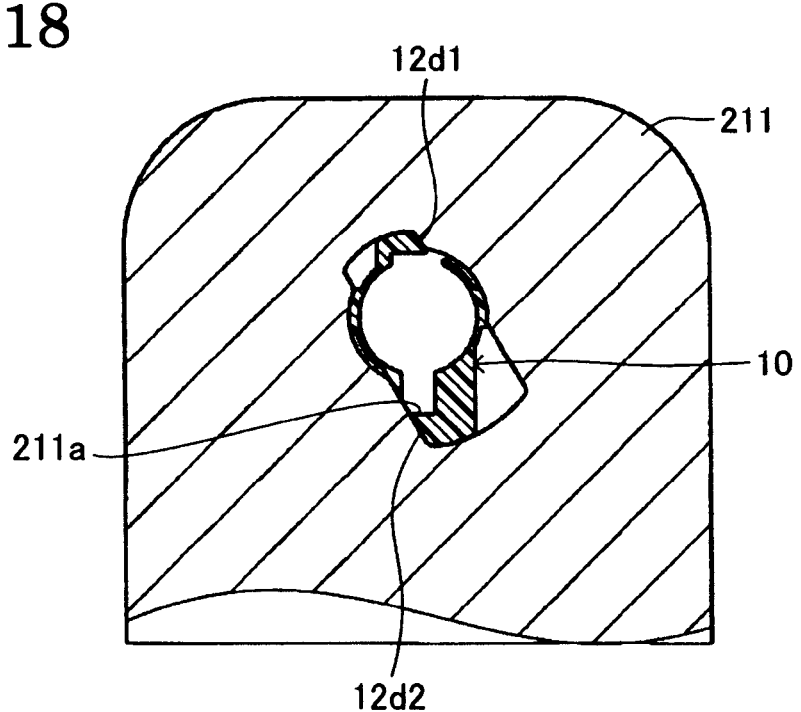
FIG. 18 is a longitudinal cross-sectional view taken on line XVIII-XVIII of FIG. 16.
Figure 19:
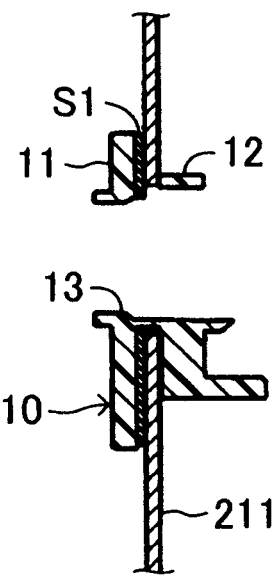
FIG. 19 is a longitudinal cross-sectional view taken on line XIX-XIX of FIG. 17.

As illustrated in FIGS. 14 and 17, the retaining portions 12c1, 12c2 are arranged to face the support wall 211 in a state where the retainer 10 is assembled to the support wall 211. The retaining portions 12c1, 12c2 contact the support wall 211 via the seal plate S1 to prevent the retainer 10 from being disassembled from the support wall 211 to the fuel filler lid box 210. The stopper portions 12d1, 12d2 are assembled within the attaching hole 211a of the support wall 211 as illustrated in FIGS. 12 and 18. The stopper portions 12d1, 12d2 are configured to contact an inner wall of the attaching hole 211a to restrict a rotation of the retainer 10 relative to the attaching hole 211a.

The insertion hole portion 13 of the retainer 10 serves as a fitting portion corresponding to a circular hole formed on the head portion 11. As illustrated in FIG. 3, an end portion 21 of the cap 20 to which a seal ring S2 is provided is configured to fit to the fitting portion in a moving direction of the lock pin 30 from an outside of the fuel filler lid box 210 into the fuel filler lid box 210. A stepped portion 14 (see FIG. 3) is formed at an end portion of the insertion hole portion 13 at a side facing the leg portion 12. The stepped portion 14 defines a fitting amount of the cap 20 relative to the retainer 10.

The cap 20 integrally formed with a housing 40 of the actuator ACT includes an operational lever portion 22, and engaging projections 23a, 23b serving as a pair. The operational lever portion 22 is integrally formed with the cap 20 at a portion which is arranged to be positioned at a lower position in a state where the cap 20 is assembled to the retainer 10. The operational lever 22 is elastically deformable by a manual operation at an outside of the fuel filler lid box 210 to tilt. The operational lever portion 22 includes a projection portion (i.e., serving as a second engaging portion) 22a which is engageable with/detachable from the engaging portion 12a of the retainer 10. In those circumstances, configurations of the engaging portion 12a of the retainer 10 and the projection portion 22a of the operational lever portion 22 may be changed. That is, an engaging portion having a projection may be formed at the retainer 10 and an engaging portion which engages with the engaging portion having the projection may be formed at the operational lever portion 22.

Each of the engaging projections 23a, 23b is configured to slidably fit to each of the recess portions 12b1, 12b2 of the retainer 10, respectively, when the cap 20 is assembled to the retainer 10. The engaging projections 23a, 23b are integrally formed with the cap 20. Further, each of the engaging projections 23a, 23b forms a concave and convex fitting portion between the retainer 10 and the cap 20 together with each of the recess portions 12b1, 12b2. In those circumstances, alternatively, the engaging projections may be formed at the retainer 10 and the recess portions may be formed at the cap 20.

As shown in FIG. 3, the lock pin 30 is assembled within the cap 20 extending in a moving direction thereof in a state where a seal ring S3 is attached thereto. The lock pin 30 is arranged to penetrate through the cap 20 and the housing 40. As shown in FIG. 1, an end portion 31 of the lock pin 30 which protrudes into the fuel filler lid box 210 is configured to engage with and disengage from an engaging hole 221 formed on the fuel filler door 220 for opening and closing the opening portion 210a of the fuel filler lid box 210. A manual operation portion 32 is provided at an end portion of the lock pin 30 which protrudes outside the housing 40. The manual operation portion 32 is provided for manually retreating the lock pin 30 by means of a cable, or a wire, or the like, accessing from an inside of the vehicle in case that an electric motor 50 of the actuator ACT does not operate.

Figure 6:
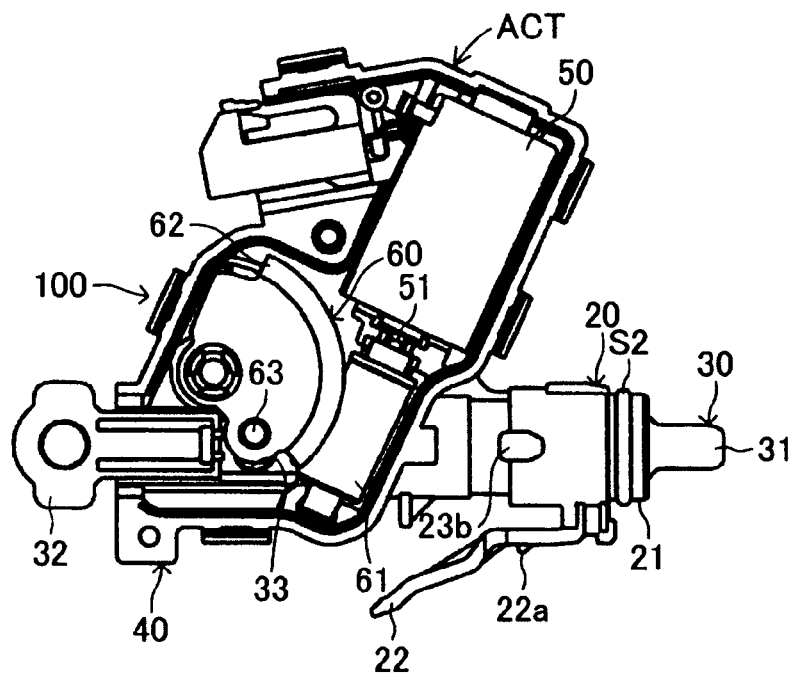
FIG. 6 is a lateral view of a state where a cover is removed from a housing of the actuator shown in FIG. 5.
Figure 7:
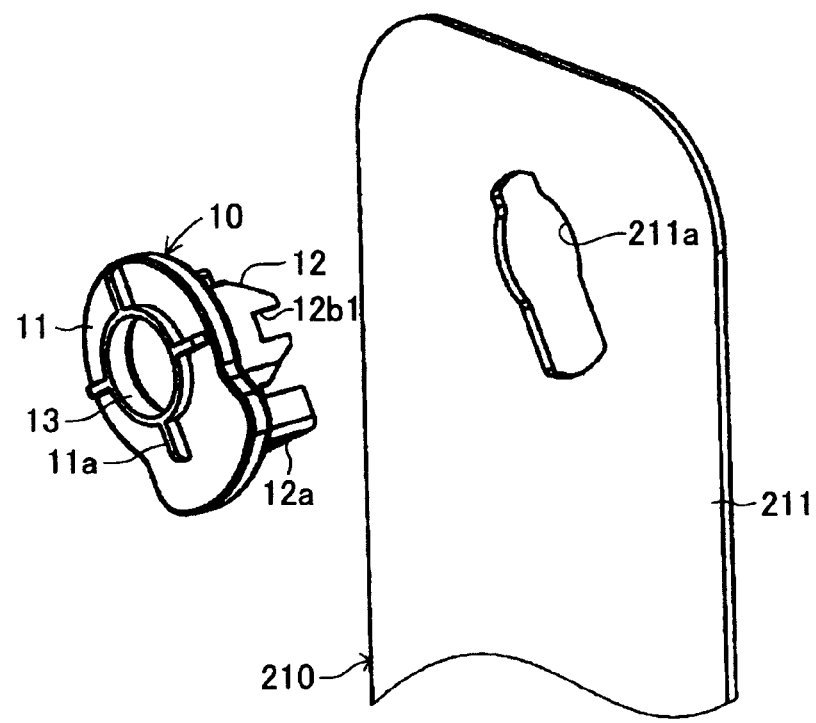
FIG. 7 is a perspective view showing a state where the retainer is not assembled to a support wall shown in FIGS. 1 to 5.
Figure 8:
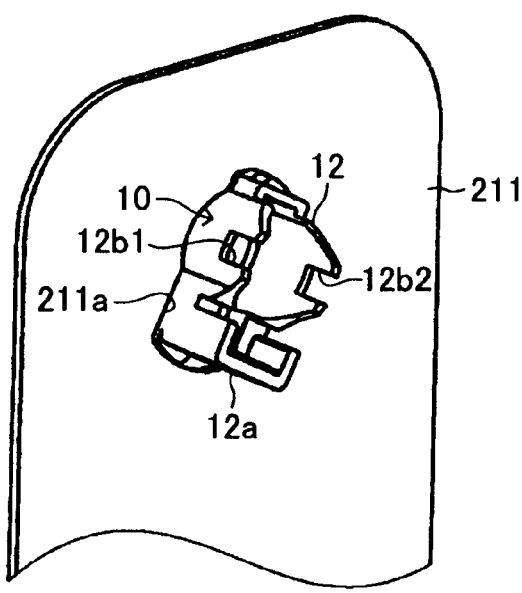
FIG. 8 is a perspective view showing a state where the retainer shown in FIG. 7 is inserted into an attaching hole formed on the support wall.
Figure 9:
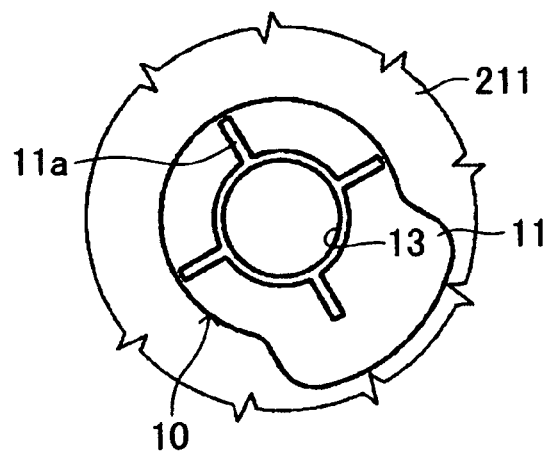
FIG. 9 is a view viewing the state shown in FIG. 8 from inside a fuel filler lid box.
Figure 10:
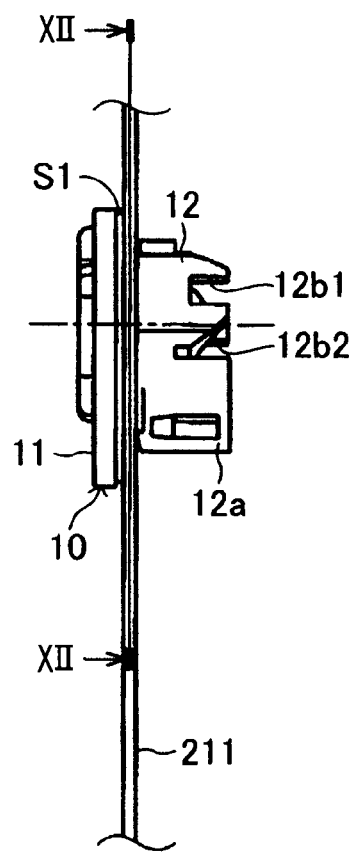
FIG. 10 is a lateral view of the retainer and the support wall shown in FIG. 9.
Figure 11:
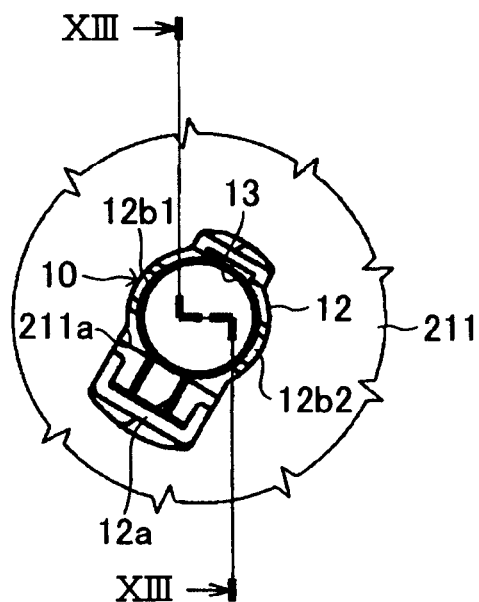
FIG. 11 is a view viewing the state shown in FIG. 8 from outside the fuel filler lid box.

As shown in FIG. 6, the actuator ACT includes the electric motor 50 assembled within the housing 40 made of resin and a converting mechanism 60. The electric motor 50 is activated or stopped by an ON-OFF operation of a switch which is provided at a key for wireless communications. The converting mechanism 60 converts a rotational output of the electric motor 50 to an axial output of the lock pin 30. In FIG. 6, a cover 41 (see FIG. 1) is removed from the housing 40 which houses the electric motor 50 and the converting mechanism 60.

The converting mechanism 60 includes a resin made worm 61, a resin made sector gear 62, and a resin made pin 63. The worm 61 is assembled to be integrally rotatable with an output shaft 51 of the electric motor 50. The sector gear 62 is assembled to the housing 40 to be rotatable and to mesh with the worm 61. The pin 63 is secured to the sector gear 62 to engage with a long bore 33 provided at the lock pin 30. Because parts of the converting mechanism 60 are made of resin, the converting mechanism 60 is lighter than the electric motor 50 which includes metal parts. The long bore 33 is formed and arranged so that a longitudinal direction of the long bore 33 is approximately perpendicular to a moving direction of the lock pin 30.

According to the constructions of the embodiment, when the operational lever portion 22 is not operated in a state where the end portion 21 of the cap 20 is fitted to the insertion hole portion (i.e., serving as a fitting portion) 13 of the retainer 10, the projection portion 22a of the operational lever 22 is elastically engaged with the engaging portion 12a of the retainer 10 to restrict the disengagement of the cap 20 from the retainer 10. Further, when the operational lever portion 22 is operated upward to be in the tilted state, the projection portion 22a of the operational lever portion 22 is disengaged from the engaging portion 12a of the retainer 10 to allow the cap 20 to be removed from the retainer 10.

Thus, the cap 20 and the lock pin 30 are removed from the retainer 10 together with the actuator ACT by manually pulling the cap 20 and the lock pin 30 towards outside the fuel filler lid box 210 together with the actuator ACT to disengage the projection portion 22a of the operational lever portion 22 from the engaging portion 12a of the retainer 10 in a state where the operational lever portion 22 is tilted by a predetermined amount by a manual operation at the outside of the fuel filler lid box 210. By manually pushing the cap 20 to fit the end portion 21 of the cap 20 into the insertion hole portion (fitting portion) 13 of the retainer 10 from a state where the projection portion 22a of the operational lever portion 22 and the engaging portion 12a of the retainer 10 is engageable (i.e., the positioning of the projection portion 22a and the engaging portion 12a is conducted), the cap 20 and the lock pin 30 are assembled to the retainer 10 together with the actuator ACT applying an elastic deformation of the operational lever portion 22. In the foregoing assembled state, because the projection portion 22a of the operational lever portion 22 is elastically engaged with the engaging portion 12a of the retainer 10 to restrict the disengagement of the cap 20 from the retainer 10, the cap 20 and the lock pin 30 are appropriately retained by the retainer 10 together with the actuator ACT.

As explained above, according to the constructions of the embodiment, the cap 20 and the lock pin 30 are attachable to and detachable from the retainer 10 together with the actuator ACT only by a manual operation at an outside of the fuel filler lid box 210. Namely, the cap 20 and the lock pin 30 are attachable to and detachable from the retainer 10 together with the actuator ACT without an operation at an inside of the fuel filler lid box 210 and without requiring tools. Further, when attaching and detaching the cap 20, the lock pin 30, and the actuator ACT, or the like, relative to the retainer 10, a rotational operation of the cap 20, the lock pin 30, and the actuator ACT, or the like, relative to the retainer 10 is not required. Assembling of the cap 20, the lock pin 30, and the actuator ACT, or the like, relative to the retainer 10 is performed by a positioning operation and an inserting operation relative to the retainer 10. Further, disassembling of the cap 20, the lock pin 30, and the actuator ACT, or the like, from the retainer 10 is performed by a tilting operation (gripping operation) of the operational lever portion and a pulling operation of the cap 20, the lock pin 30, and the actuator ACT, or the like. Accordingly, maintenance performance of the lid lock apparatus 100 (i.e., attaching and detaching performance of the cap 20, the lock pin 30, and the actuator ACT, or the like, relative to the retainer 10) is enhanced.

According to the embodiment, because the elastic deformation of the operational lever portion 22 is applied when the cap 20, the lock pin 30, and the actuator ACT, or the like, are assembled to the retainer 10, an engaging noise is generated and an engaging feeling is transmitted to an operator when the projection portion 22a of the operational lever portion 22 is engaged with the engaging portion 12a of the retainer 10 at the assembling of the cap 20, the lock pin 30, and the actuator ACT, or the like, to the retainer 10. Accordingly, the operator recognizes the completion of the assembling of the cap 20, the lock pin 30, and the actuator ACT, or the like, to the retainer 10 appropriately by the engaging noise and the engaging feeling.

Further, according to the construction of the embodiment, the concave and convex fitting portion is formed between the retainer 10 and the cap 20 by each of the recess portions 12b1, 12b2 of the retainer 10 and each of the engaging projections 23a, 23b of the cap 20, and an engaging position of the projection portion 22a of the operational lever portion 22 and the engaging portion 12a of the retainer 10 is positioned at a lower position compared to the concave and convex fitting portion. Accordingly, a supporting rigidity of the cap 20 and the lock pin 30, or the like, relative to the retainer 10 is enhanced by the concave and convex fitting portion, and thus, the vibration resistance performance of the lid lock apparatus 100 is enhanced.

Further, according to the embodiment, the lock pin 30 is configured to move axially by the actuator ACT, the electric motor 50 and the converting mechanism 60 of the actuator ACT are arranged upward of the lock pin 30, and the electric motor 50 is positioned closer to the support wall 211 compared to the converting mechanism 60 relative to the support wall 211. According to the foregoing construction, compared to the construction in which the converting mechanism 60 is positioned closer to the support wall 211 compared to the electric motor 50 relative to the support wall 211, the position of the center of the gravity of the lid lock apparatus 100 can be positioned closer to the support wall 211, which enhances the vibration resistance performance of the lid lock apparatus 100.

Figure 20:
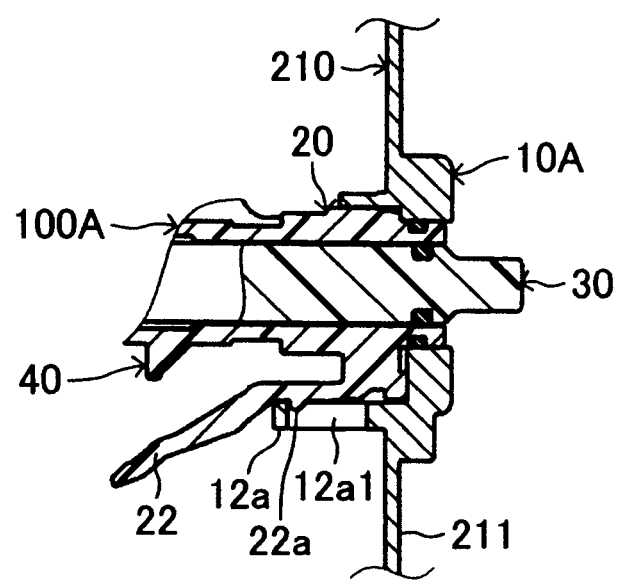
FIG. 20 is a partial longitudinal cross-sectional view according to a modified example in which a retainer is integrally formed with a support wall.

According to the embodiment, the retainer 10 of the lid lock apparatus 100 is configured to be attached to and detached from the support wall 211 of the fuel filler lid box 210. However, as shown in FIG. 20, a retainer 10A may be integrally formed on the support wall 211 of the fuel filler lid box 210 so that the cap 20 of a lid lock apparatus 100A for a vehicle is attached and detached relative to the retainer 10A likewise as in the foregoing embodiment.

According to the embodiment, the lock pin 30 of the lid lock apparatus 100 for the vehicle is activated by the actuator ACT. However, the construction of the embodiment is applicable to a lid lock apparatus in which a lock pin is operated by a manual operation (i.e., the actuator ACT is not applied).

According to the lid lock apparatus 100, the operational lever portion 22 formed on the cap 20 is elastically deformed by a manual operation at the outside of the fuel filler lid box 210 to tilt. In a case where the operational lever portion 22 is operated to tilt, the projection portion 22a of the operational lever portion 22 comes to disengage from the engaging portion 12a of the retainer 10 to allow the cap 20 to detach from the retainer 10.

Thus, by pulling the cap 20 and the lock pin 30 towards the outside of the fuel filler lid box 210 in a state where the operational lever portion 22 is tilted in order to disengage the projection portion 22a of the operational lever portion 22 from the engaging portion 12a of the retainer 10, the cap 20 and the lock pin 30 can be removed from the retainer 10. Further, the cap 20 and the lock pin 30 can be assembled to the retainer 10 by pushing the cap 20 to fit the end portion 21 of the cap 20 to the fitting portion of the retainer 10 using the elastic deformation of the operational lever portion 22 in a state where the projection portion 22a of the operational lever portion 22 and the engaging portion 12a of the retainer 10 are engageable (i.e., the positioning of the projection portion 22a of the operational lever portion 22 and the engaging portion 12a of the retainer 10 are performed). According to the foregoing assembling state, the projection portion 22a of the operational lever portion 22 is elastically engaged with the engaging portion 12a of the retainer 10 to restrict the disengagement of the cap 20 from the retainer 10. Thus, the cap 20 and the lock pin 30 are appropriately retained by the retainer 10.

According to the constructions of the embodiment, the cap 20 and the lock pin 30 are attachable to and detachable from the retainer 10 only by a manual operation at an outside of the fuel filler lid box 210, and thus the cap 20 and the lock pin 30 are detachable from the retainer 10 without an operation at an inside of the fuel filler lid box 210 and without requiring tools. Further, when attaching or detaching the cap 20 and the lock pin 30 relative to the retainer 10, a rotational operation of the cap 20 and the lock pin 30 relative to the retainer 10 is not required. Assembling of the cap 20 and the lock pin 30 relative to the retainer 10 is performed by a positioning operation and an inserting operation relative to the retainer 10. Further, disassembling of the cap 20 and the lock pin 30 relative to the retainer 10 is performed by a tilting operation (gripping operation) of the operational lever portion 22 and a pulling operation of the cap 20 and the lock pin 30. Accordingly, maintenance performance of the lid lock apparatus 100 (i.e., attaching and detaching performance of the cap 20 and the lock pin 30 relative to the retainer 10) is enhanced.

According to the embodiment, because the elastic deformation of the operational lever portion 22 is applied when the cap 20 and the lock pin 30 are assembled to the retainer 10, an engaging noise is generated and an engaging feeling is transmitted to an operator when the projection portion 22a of the operational lever portion 22 is engaged with the engaging portion 12a of the retainer 10 at the assembling of the cap 20 and the lock pin 30 to the retainer 10. Accordingly, the operator recognizes the completion of the assembling of the cap 20 and the lock pin 30 to the retainer 10 appropriately by the engaging noise and the engaging feeling.

According to the embodiment, the lid lock apparatus 100 includes a pair of engaging projections (concave and convex fitting portions) 23a, 23b formed between the retainer 10 and the cap 20 to be fitted from an outside of the fuel filler lid box 210 towards an inside of the fuel filler lid box 210. The engaging projections (concave and convex fitting portions) 23a, 23b are positioned away from the support wall 211 relative to the fitting portion 13. An engaging position of the projection portion (second engaging portion) 22a of the operational lever portion 22 and the engaging portion (first engaging portion) 12a of the retainer 10 is positioned at a position which is offset from a facing direction of the engaging projections (concave and convex fitting portions) 23a, 23b.

According to the construction of the embodiment, the support rigidity of the cap 20 and the lock pin 30, or the like, relative to the retainer 10 is enhanced by the concave and convex fitting portions, and thus the vibration resistance performance of the lid lock apparatus 100, 100A is enhanced.

According to the embodiment, the lock pin 30 is configured to move axially by means of the electric motor 50 and the actuator ACT which includes the converting mechanism 60 conversing a rotational output of the electric motor to an axial movement of the lock pin 30 and the housing 40 accommodating the electric motor 50 and the converting mechanism 60. The housing 40 and the cap 20 are integrally formed.

According to the construction of the embodiment, because the cap 20 and the lock pin 30 are attachable to and detachable from the retainer 10 only by a manual operation at an outside of the fuel filler lid box 210, even if the actuator ACT including the motor 50 and the converting mechanism 60 is provided for actuating the lock pin 30 to move along a longitudinal direction, the cap 20 and the lock pin 30 are attached to and detached from the support wall 211 together with the actuator ACT without increasing the size of the attaching hole formed on the support wall and the size of the retainer covering the attaching hole.

According to the embodiment, the electric motor 50 and the converting mechanism 60 are positioned upward of the lock pin 30 and the electric motor 50 is arranged closer to the support wall 211 compared to the converting mechanism 60 relative to the support wall 211 in a state where the lock pin 30 is assembled to the cap 20 attached to the retainer 10 provided at the support wall 211.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A lid lock apparatus for a vehicle, comprising:
   a retainer provided at a support wall of a lid box formed at a vehicle body;
   a cap detachably assembled to the retainer;
   a lock pin assembled to move axially relative to the cap, the lock pin being arranged penetrating through the support wall and protruding within the lid box;
   a lid configured to tilt relative to the lid box and opening and closing an opening portion of the lid box, the lid being configured to be retained at a closed state by the lock pin;
   the retainer being formed with a fitting portion to which an end portion of the cap is configured to fit from an outside of the lid box towards an inside of the lid box, the retainer being formed with a first engaging portion formed to be positioned outward of the lid box relative to the fitting portion, at least one stopper connected to the first engaging portion, and at least one receiving portion between the stopper and the first engaging portion;
   an operational lever portion formed on the cap, the operational lever portion configured to be elastically deformed to tilt by an operation at the outside of the lid box, and the operational lever portion including a second engaging portion configured to engage with and disengage from the first engaging portion; and
   a pair of concave and convex fitting portions to be engaged with each other, the pair of concave and convex fitting portions being formed between the retainer and the cap, the cap being fitted from the outside of the lid box towards the inside of the lid box, and the pair of concave and convex fitting portions positioned away from the support wall relative to the fitting portion,
   wherein the support wall includes a hole with an inner wall that is received by the receiving portion and is in contact with the stopper of the retainer,
   wherein an engaging position of the second engaging portion of the operational lever portion and the first engaging portion of the retainer is positioned at a position which is offset from a facing direction of the pair of concave and convex fitting portions,
   wherein the pair of convex and concave fitting portions are aligned to be engaged with each other in a rotational position when the operational lever portion at least partially engages the second engaging portion with the first engaging portion in an axial direction toward the engaging position,
   wherein the second engaging portion of the operational lever portion is elastically engaged with the first engaging portion of the retainer to restrict a disengagement of the cap from the retainer when the operational lever portion is not operated in a state where the end portion of the cap is fitted to the fitting portion of the retainer, and
   wherein the second engaging portion of the operational lever portion is disengaged from the first engaging portion of the retainer to allow the cap to disengage from the retainer when the operational lever is operated to be in a tilting state.

2. The lid lock apparatus for the vehicle according to claim 1, wherein the lock pin is configured to move axially by means of an actuator which includes an electric motor, a converting mechanism converting a rotational output of the electric motor to an axial movement of the lock pin, and a housing accommodating the electric motor and the converting mechanism, and
   wherein the housing and the cap are integrally formed.

3. The lid lock apparatus for the vehicle according to claim 2, wherein the electric motor and the converting mechanism are positioned upward of the lock pin and the electric motor is arranged closer to the support wall compared to the converting mechanism in a state where the lock pin is assembled to the cap attached to the retainer provided at the support wall.

4. A lid lock apparatus for a vehicle, comprising:
   a retainer provided at a support wall of a lid box formed at a vehicle body, the retainer including a fitting portion, a first engaging portion positioned outward of the lid box relative to the fitting portion, at least one stopper connected to the first engaging portion, and at least one receiving portion between the stopper and the first engaging portion;
   a cap detachably assembled to the retainer, the cap including an end portion configured to fit with the fitting portion from an outside of the lid box towards an inside of the lid box;
   a lock pin assembled to move axially relative to the cap, the lock pin being arranged penetrating through the support wall and protruding within the lid box;
   a lid configured to tilt relative to the lid box, the lid opening and closing an opening portion of the lid box, and the lid being configured to be retained at a closed state by the lock pin;
   an operational lever portion formed on the cap, the operational lever portion configured to be elastically deformed to tilt by an operation at the outside of the lid box, and the operational lever portion including a second engaging portion configured to engage with and disengage from the first engaging portion; and
   a pair of concave and convex fitting portions formed between the retainer and the cap to be engaged with each other from the outside of the lid box towards the inside of the lid box,
   wherein the support wall includes a hole with an inner wall that is received by the receiving portion and in is contact with the stopper of the retainer, and
   wherein when the end portion of the cap is fitted to the fitting portion of the retainer at least a portion of an engagement between the pair of concave and convex fitting portions is between the lid box and an engagement between a portion of the first engaging portion and a projection of the second engaging portion along a longitudinal axis of the locking pin.

* * * * *